UNITED STATES PATENT OFFICE.

WILLIAM BROWNLOW FAIR, OF PARIS, TEXAS.

DETERGENT COMPOUND.

SPECIFICATION forming part of Letters Patent No. 540,654, dated June 11, 1895.

Application filed January 14, 1895. Serial No. 534,935. (No specimens.)

*To all whom it may concern:*

Be it known that I, WILLIAM BROWNLOW FAIR, a citizen of the United States, residing at Paris, in the county of Lamar and State of Texas, have invented a new and useful composition of fluid to be used for cleansing clothes, washing utensils and floors, and for all purposes requiring the use of a cheap and convenient detergent, of which the following is a specification.

My composition of washing fluid is composed of the following ingredients combined in the proportions stated, viz: pure water, twelve gallons; lye, forty-eight pounds; aqua ammonia, one quart; indigo, thirteen ounces; borax, (biboratic soda,) four and one-half pounds; mountain balm, (*Eriodyction*,) sixteen pounds. Mix thoroughly by agitation.

Directions for using: In a tub of five gallons of water stir one tablespoonful of the fluid in which soak the clothes to be washed from twelve to twenty minutes. Then boil the clothes in soap suds in which place one tablespoonful of the fluid to five gallons of water. Rinse well and the clothes will be clean. Water similarly prepared cleanses utensils, floors, tables, &c.

What I claim, and desire to secure by Letters Patent of the United States, is—

The herein described detergent composition consisting of water, lye, ammonia, borax, indigo and mountain balm (*Eriodyction*) in substantially the proportions specified.

Witness my signature this 17th day of August, 1894.

WILLIAM BROWNLOW FAIR.

Witnesses:
CHAS. F. DORCHESTER,
FRED. W. MINER.